United States Patent
Patel et al.

(10) Patent No.: US 9,413,563 B2
(45) Date of Patent: Aug. 9, 2016

(54) METHOD AND APPARATUS FOR CHANNEL ESTIMATION USING LOCALIZED SINR IN WIRELESS COMMUNICATION SYSTEMS

(71) Applicant: MBIT WIRELESS, INC., Newport Beach, CA (US)

(72) Inventors: Bhaskar Patel, San Clemente, CA (US); Arumugam Govindswamy, Irvine, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 0 days.

(21) Appl. No.: 14/564,874

(22) Filed: Dec. 9, 2014

(65) Prior Publication Data

US 2016/0164700 A1    Jun. 9, 2016

(51) Int. Cl.
   *H04L 25/02*    (2006.01)

(52) U.S. Cl.
   CPC .................. *H04L 25/0224* (2013.01)

(58) Field of Classification Search
   CPC .............. H04B 1/10; H04B 1/16; H04B 1/38; H04B 7/00; H04B 7/02; H04B 7/04; H04B 7/0413; H04B 7/216; H04B 7/24; H04B 15/00; H04B 17/00; H04J 3/00; H04J 11/00; H04K 1/10; H04L 1/00; H04L 1/02; H04L 1/18; H04L 5/00; H04L 5/16; H04L 25/0224; H04L 25/03; H04L 27/00; H04L 27/08; H04L 27/28; H04L 27/30; H04L 43/04; H04M 1/00; H04Q 7/22; H04W 4/00; H04W 24/00; H04W 24/02; H04W 36/00; H04W 72/04

USPC ......... 370/208, 210, 252, 328, 329, 330, 335, 370/337, 342, 345; 375/147, 219, 227, 232, 375/259, 260, 267, 316, 341, 343, 346, 347, 375/349, 350; 455/39, 63.1, 101, 103, 296, 455/334, 500, 522; 714/748
   See application file for complete search history.

(56) References Cited

U.S. PATENT DOCUMENTS

| | | | |
|---|---|---|---|
| 2007/0242782 A1* | 10/2007 | Han et al. ....................... | 375/343 |
| 2007/0263736 A1* | 11/2007 | Yuda et al. ..................... | 375/260 |
| 2008/0080630 A1* | 4/2008 | Sung .............................. | 375/260 |
| 2008/0165734 A1* | 7/2008 | Hart et al. ...................... | 370/330 |
| 2008/0225934 A1* | 9/2008 | Mourad et al. ................. | 375/227 |
| 2009/0052566 A1* | 2/2009 | Maltsev et al. ................. | 375/260 |
| 2010/0098030 A1* | 4/2010 | Wang et al. ..................... | 370/335 |
| 2010/0166118 A1* | 7/2010 | Mantravadi et al. ............ | 375/340 |
| 2011/0150154 A1* | 6/2011 | Chen .............................. | 375/350 |
| 2011/0173508 A1* | 7/2011 | Wehinger ...................... | 714/748 |
| 2011/0261872 A1* | 10/2011 | Wang et al. .................... | 375/227 |
| 2011/0293028 A1* | 12/2011 | Panicker et al. ............... | 375/260 |

(Continued)

*Primary Examiner* — Sam K Ahn
*Assistant Examiner* — Shawkat M Ali
(74) *Attorney, Agent, or Firm* — Lerner, David, Littenberg, Krumholz & Mentlik, LLP

(57) ABSTRACT

A method and apparatus are disclosed for channel estimation in broadband wireless communication systems by using locally prevailing SINR conditions in the RF channel bandwidth. According to one aspect, the channel estimation method adapts to the local SINR across different parts of the channel bandwidth. This leads to channel estimates that are optimized to SINR conditions prevailing in different parts of the channel bandwidth. The channel estimation method described herein may result in the reduction of channel estimation errors, which in turn may lead to improved performance of a broadband wireless communication system.

22 Claims, 12 Drawing Sheets

Illustration of localized SINR calculation

Portions of RF Channel Bandwidth over which SINR is estimated

(56) References Cited

U.S. PATENT DOCUMENTS

| | | | |
|---|---|---|---|
| 2012/0320861 A1* | 12/2012 | Kimura et al. | 370/329 |
| 2013/0034177 A1* | 2/2013 | Lee et al. | 375/267 |
| 2013/0215826 A1* | 8/2013 | Kalyani et al. | 370/328 |
| 2014/0086373 A1* | 3/2014 | Kenealy et al. | 375/349 |

* cited by examiner

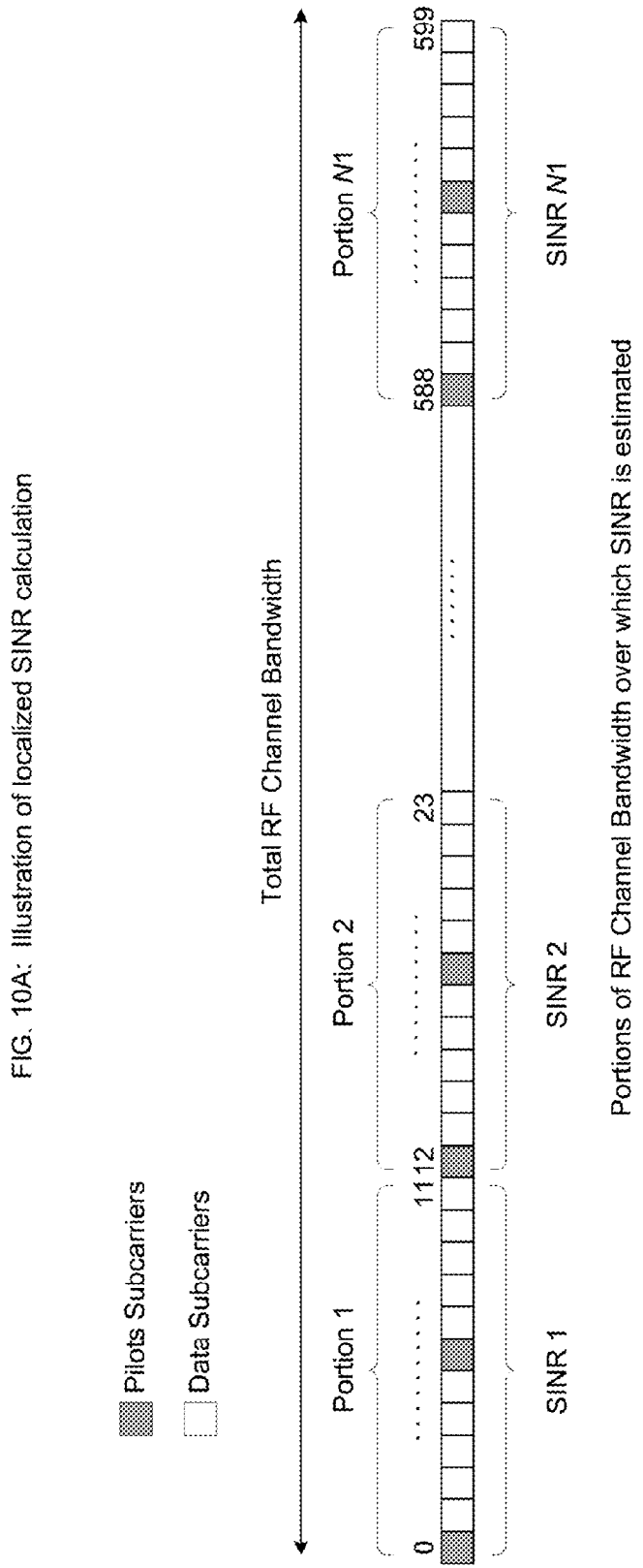
FIG. 10A: Illustration of localized SINR calculation

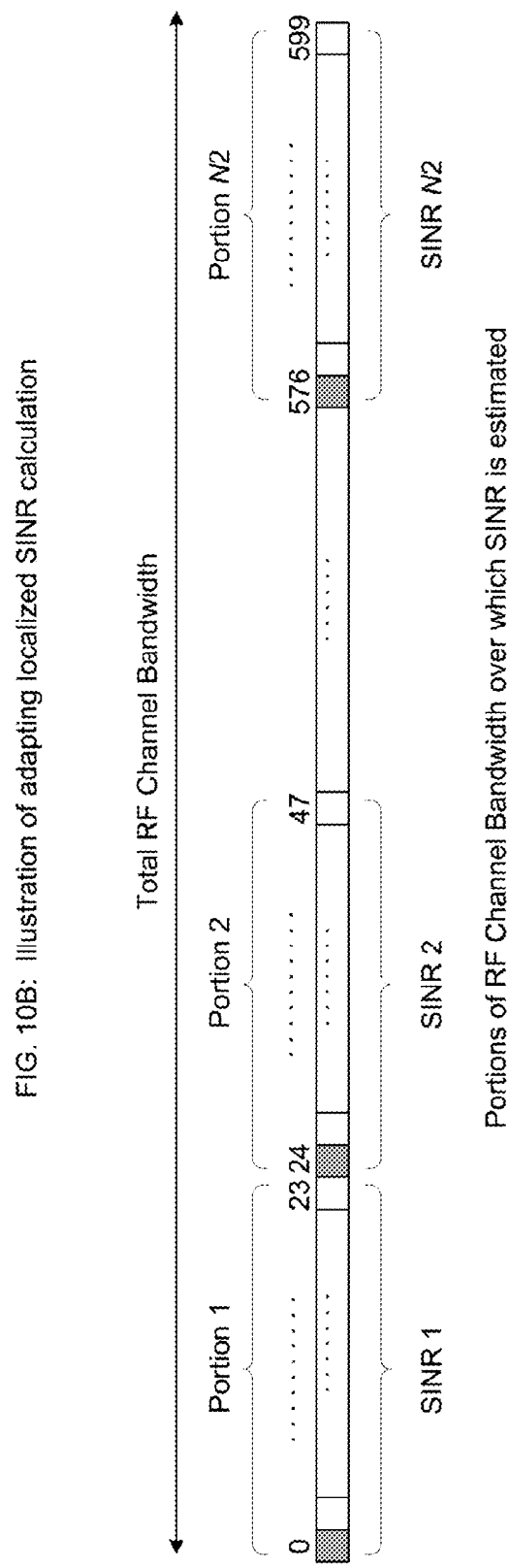
FIG. 10B: Illustration of adapting localized SINR calculation

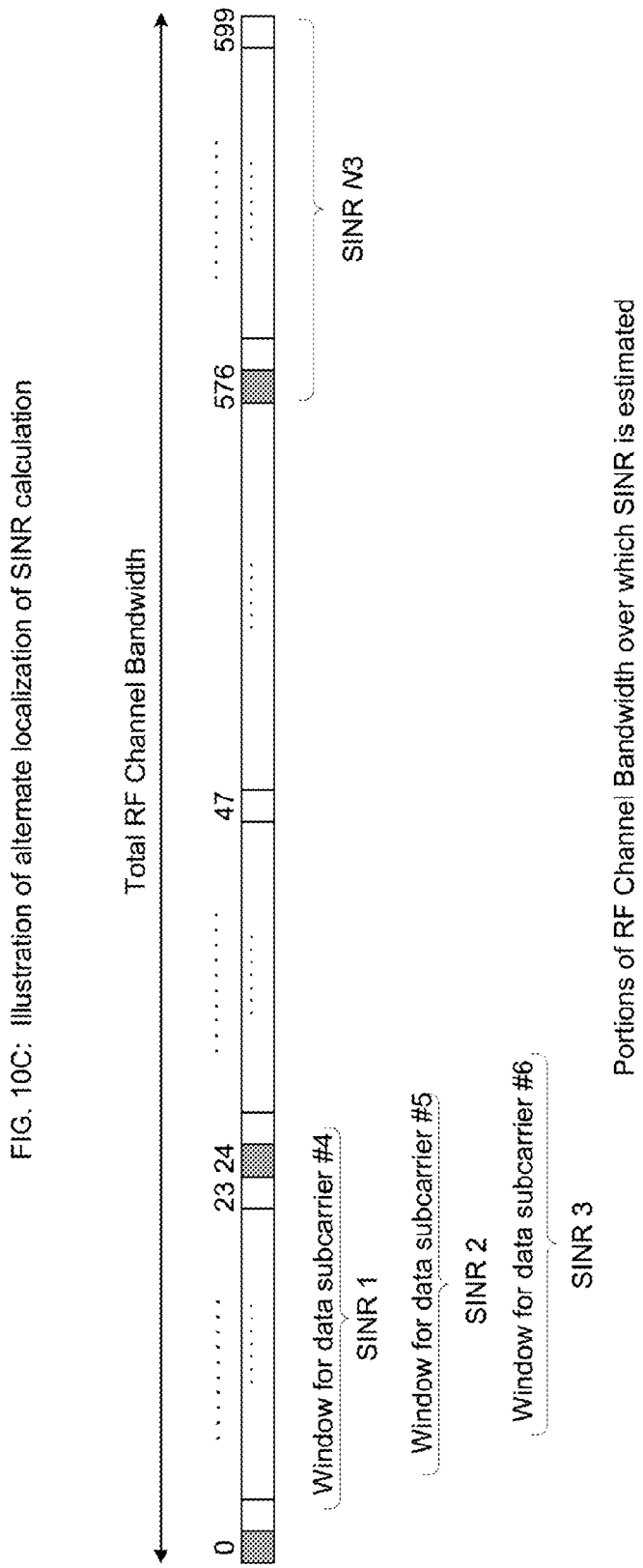

METHOD AND APPARATUS FOR CHANNEL ESTIMATION USING LOCALIZED SINR IN WIRELESS COMMUNICATION SYSTEMS

BACKGROUND OF THE INVENTION

1. Field of the Invention

The present invention relates generally to wireless communication systems and, more particularly, to methods and receiver architectures for channel estimation in client terminals of broadband wireless communication systems.

2. Description of Related Art

Typically, as shown in FIG. 1, a wireless communication system comprises elements such as client terminals or mobile stations and base stations. Other network devices may also be employed, such as a mobile switching center (not shown). As illustrated, the communication path from the base station (BS) to the client terminal or mobile station (MS) is referred to herein as a downlink (DL) direction, and the communication path from the client terminal to the base station is referred to herein as an uplink (UL) direction. In some wireless communication systems, the MS communicates with the BS in both the DL and UL directions. For instance, such communication is carried out in cellular telephone systems. In other wireless communication systems, the client terminal communicates with the base stations in only one direction, usually the DL. Such DL communication may occur in applications such as paging.

As shown in FIG. 2, client terminal/MS 12 typically contains a baseband subsystem 16 and a radio frequency (RF) subsystem 18. Memory 20, such as an external memory, is shown connected to the baseband subsystem 16. The baseband subsystem 16 normally includes a micro controller unit (MCU) 22, a signal processing unit (SPU) 24, data converters 26, peripherals 28, power management 30, and memory 32 as shown in FIG. 3. The SPU may be a digital signal processor (DSP), hardware (HW) accelerators, co-processors or a combination of the above. Normally the overall control of the baseband subsystem 16 is performed by software running on the MCU 22 and the processing of signals is done by the SPU 24.

Analog to digital converters (ADCs) convert a received analog signals into digital for the baseband system to process them. Similarly, digital to analog converters (DACs) convert the processed baseband digital signals into analog for transmission. The ADCs and DACs are collectively referred to herein as "data converters" 26. The data converters 26 can either be part of the baseband subsystem 16 or the RF subsystem 18. Depending on the location of the data converters 26, the interface between the two subsystems will be different. The location of the data converters 26 does not alter the overall function of the client terminal.

An RF subsystem 18 normally includes a receiver section and a transmitter section. An example RF subsystem 18 for a time division duplex (TDD) communication system is shown in FIG. 4. The receiver section normally may include one or more receivers. The receiver 34 performs the task of converting the signal from RF to baseband. Each receiver may include mixers 36, filters 38, low noise amplifiers (LNAs) 40 and variable gain amplifiers (VGAs) 42. The transmitter section may include one or more transmitters. The transmitter 44 performs the task of converting the baseband signal up to the RF. Each transmitter may include mixers 46, filters 48, and gain control stage 50. In some architectures of the RF subsystem, some of the components may be shared between the receiver section and the transmitter section. As shown, the receiver section 34 and the transmitter section 44 are coupled to an antenna 54 via a transmit/receive switch 56. Synthesizer 58 is also shown as coupling to the receiver section 34 and the transmitter section 44. In an RF subsystem for a Frequency Division Duplex (FDD) communication system, the transmitter section and the receiver section may have separate synthesizers. The transmitter and the receiver in an RF subsystem for an FDD communication system may be coupled to the antenna using a duplexer.

The input of each receiver is normally coupled with an antenna and the output of the receiver is normally coupled with ADC. The antenna, receiver, ADC and other related components are collectively referred herein as "receive chain." FIG. 5 illustrates the elements of a receive chain.

For coherent detection at the receiver of a wireless communication system, it is necessary to know the precise reference phase and in some cases the reference amplitude of the received signal. To facilitate this at the receiver, the transmitter of a wireless communication system often embeds reference information such as pilots, training symbols, etc., in the transmitted signal.

Normally in wireless communication systems the propagation channel introduces random phase and amplitude variations to the signal. The reference information is used at the receiver to achieve accurate estimation of the propagation channel between the transmitter and the receiver and the estimation process is referred herein as channel estimation. In broadband wireless communication systems, normally the RF channel bandwidth is wide, e.g., on the order of 10 MHz to 20 MHz. The large delay spread of propagation channels in mobile communication systems leads to frequency selective fading within the RF channel, i.e., different parts of the channel bandwidth experience different fading. Furthermore, the channel conditions between the transmitter and the receiver for mobile wireless communications systems can vary rapidly because of the mobility of the client terminals and the changes in the environment.

Many different methods are used for channel estimation and some of the commonly used methods are Minimum Mean Square Error (MMSE), Wiener-Filtering, etc. Most of these methods use available channel estimates based on reference information as inputs and produce improved channel estimates for the entire channel bandwidth of interest. Normally, the available input channel estimates are obtained from the reference information or from the previously demodulated information.

Many of the commonly used channel estimation methods require knowledge of the channel statistics. Two commonly used channel statistics are the propagation channel correlation over time and channel bandwidth and the Signal-to-Interference and Noise Ratio (SINR) of the received signal. Some channel estimation methods jointly use these two channel statistics in a manner that minimizes the channel estimation error. When the SINR of the received signal is high, the input channel estimates may be considered more reliable and therefore more emphasis is given to the input channel estimates by the channel estimation method. When the SINR is low, the input channel estimates are likely to be less reliable and therefore more averaging is performed among adjacent input channel estimates in accordance with the propagation channel correlation. The channel estimation methods dynamically vary the degree of averaging versus interpolation. When the SINR is high, the channel estimation performs more interpolation according to channel correlation and when the SINR is low the channel estimation performs more averaging.

In general the channel statistics may not be known a priori. However, under typical operating conditions for a particular wireless communication system, some a priori information may be used to get a first order approximation of the channel statistics. Based on extensive field measurements and laboratory experiments, the propagation of signals in mobile wireless communication environment may be described using a few channel models. For example, a propagation channel model called "Pedestrian" has been defined by the International Telecommunication Union (ITU) to model the channel behavior under pedestrian mobile conditions. Similarly, propagation channel models called "Vehicular" and "Indoor" have been defined by the ITU to model the channel behavior under vehicular mobile and indoor usage conditions respectively. For all these ITU propagation channel models there are two variants defined, namely A and B. These channel models indicate the behavior of the channel in an average sense for a particular propagation environment. By using the reference information such as pilots and training symbols in combination with the propagation channel models, the propagation channel statistics may be accurately estimated.

Some channel estimation methods may make assumptions about the propagation channel statistics while other channel estimation methods may use the measured propagation channel statistics from the received signal to adapt the channel estimation to the prevailing propagation channel statistics.

SUMMARY OF THE INVENTION

As described herein, locally prevailing SINR conditions in the RF channel bandwidth are used to provide more accurate channel estimation. For instance, the channel estimation process is able to adapt to the local SINR across different parts of the channel bandwidth. This, in turn, allows the receiver system to arrive at channel estimates that are optimized to SINR conditions prevailing in different parts of the channel bandwidth. This improved channel estimation process is able to reduce channel estimation errors. And this leads to improved performance of portable communication devices in the broadband wireless communication system.

According to one aspect of the invention, a method of channel estimation in a receiver used in a wireless communication system is provided. The method comprises identifying, by one or more processors of the receiver, reference information for a received signal; deriving, by the one or more processors, a channel correlation estimate from the reference information; determining, by the one or more processors from the derived channel correlation estimate, a size of a subset of reference information subcarriers to be used for channel estimation of a given data subcarrier, the subset being fewer than all of the reference information subcarriers associated with the received signal; estimating, by the one or more processors, a localized SINR over the subset of the reference information subcarriers; and performing, by the one or more processors, channel estimation for the given data subcarrier using the channel correlation estimate and the estimated localized SINR, the channel estimation being applicable to data demodulation of the received signal.

In one example, the reference information comprises at least one of pilot symbols and training symbols of the received signal. In another example, estimating the localized SINR is performed across different parts of a channel bandwidth of the received signal. In a further example, the estimated localized SINR is limited to a portion of an RF channel of the received signal for which channel estimation is being performed. In yet another example, a portion of an RF channel of the received signal for which channel estimation is being performed is dynamically adjustable according to the channel correlation estimate.

According to another example, the estimated localized SINR is an estimated SINR for a group of subcarriers that are closest to the given data subcarrier. Here, the method may further comprise selecting a window of subcarriers, wherein selection of a size of the window is determined using channel correlation centered around a particular data subcarrier for which the channel estimation is being performed.

In a further example, the estimated localized SINR for a portion of an RF channel for which the channel estimation is being performed is estimated using a mean power level of any pilot channel estimates in a same portion of the RF channel. And in yet another example, the channel correlation and the estimated localized SINR are used to select from a set of predetermined filters for performing Minimum Mean Square Error or Wiener filtering.

According to another aspect of the invention, a receiver device for use in a wireless communication apparatus is provided. The receiver device comprises means for receiving a signal and one or more processing devices operatively coupled to the receiving means. The received signal has reference information associated therewith. And the one or more processing devices are configured to derive a channel correlation estimate from the reference information; determine, from the derived channel correlation estimate, a size of a subset of reference information subcarriers to be used for channel estimation of a given data subcarrier, the subset being fewer than all of the reference information subcarriers associated with the received signal; estimate a localized SINR over the subset of the reference information subcarriers; and perform channel estimation for the given data subcarrier using the channel correlation estimate and the estimated localized SINR, the channel estimation being applicable to data demodulation of the received signal.

In one example, the receiving means comprises one of an RF subsystem of the wireless communication apparatus, a receiver of the RF subsystem, or a receive chain of the wireless communication apparatus. In another example, the one or more processors estimate the localized SINR across different parts of a channel bandwidth of the received signal.

In a further example, a portion of an RF channel of the received signal for which channel estimation is performed is dynamically adjustable according to the channel correlation estimate. And in yet another example, the estimated localized SINR for a portion of an RF channel for which the channel estimation being performed is estimated using a mean power level of any pilot channel estimates in a same portion of the RF channel.

In accordance with a further aspect of the invention, a wireless communication apparatus comprises a radio subsystem and a baseband subsystem. The radio subsystem includes a receiver element configure to receive a signal. The received signal has reference information associated therewith. The baseband subsystem includes one or more processing devices operatively coupled to the receiver element of the radio subsystem. The one or more processing devices are configured to derive a channel correlation estimate from the reference information; determine, from the derived channel correlation estimate, a size of a subset of reference information subcarriers to be used for channel estimation of a given data subcarrier, the subset being fewer than all of the reference information subcarriers associated with the received signal; estimate a localized SINR over the subset of the reference information subcarriers; and perform channel estimation for the given data subcarrier using the channel correlation estimate and the estimated localized SINR, the channel estimation being applicable to data demodulation of the received signal.

In one example, the estimated localized SINR is limited to a portion of an RF channel of the received signal for which channel estimation is performed. In another example, the estimated localized SINR may be an estimated SINR for a group of subcarriers that are closest to the given data subcarrier. In this case, the one or more processing devices may be further configured to select a window of subcarriers, wherein selection of a size of the window is determined using channel correlation centered around a particular data subcarrier for which the channel estimation is being performed.

And in yet another aspect of the invention, a non-transitory recording medium stores instructions thereon. The instructions, when executed by one or more processing devices, cause the one or more processing devices to execute a method of channel estimation. The method comprises identifying, by one or more processors, reference information for a received signal;

deriving, by the one or more processors, a channel correlation estimate from the reference information; determining, by the one or more processors from the derived channel correlation estimate, a size of a subset of reference information subcarriers to be used for channel estimation of a given data subcarrier, the subset being fewer than all of the reference information subcarriers associated with the received signal; estimating, by the one or more processors, a localized SINR over the subset of the reference information subcarriers; and performing, by the one or more processors, channel estimation for the given data subcarrier using the channel correlation estimate and the estimated localized SINR, the channel estimation being applicable to data demodulation of the received signal.

In one example, the reference information comprises at least one of pilot symbols and training symbols of the received signal. In another example, estimating the localized SINR is performed across different parts of a channel bandwidth of the received signal. And in a further example, the estimated localized SINR is an estimated SINR for a group of subcarriers that are closest to the given data subcarrier.

BRIEF DESCRIPTION OF THE DRAWINGS

FIGS. 10A-10C illustrate different methods for determining a localized signal to noise ratio according to aspects of the present invention.

DETAILED DESCRIPTION

Figure 1:
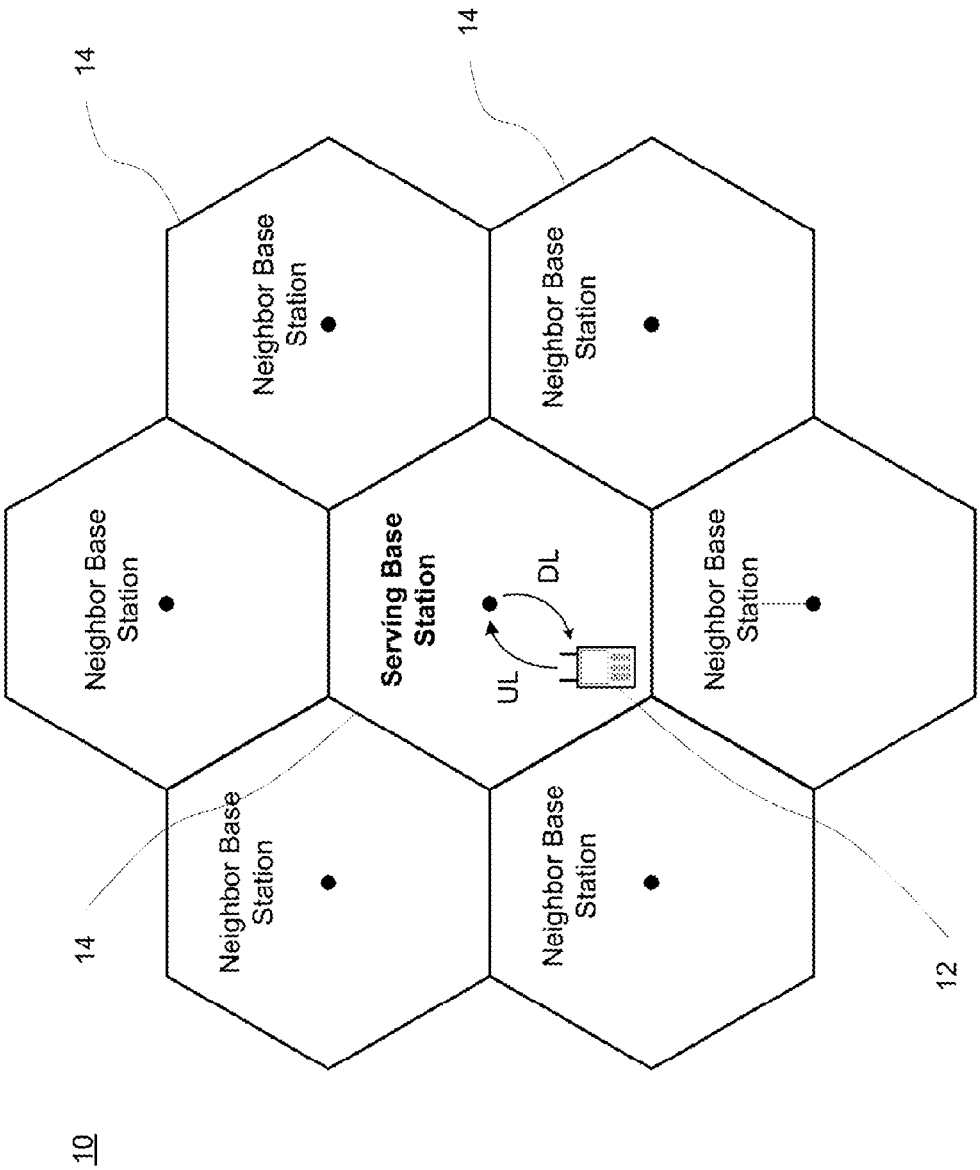
FIG. 1 illustrates a conventional mobile wireless communication system.
Figure 2:
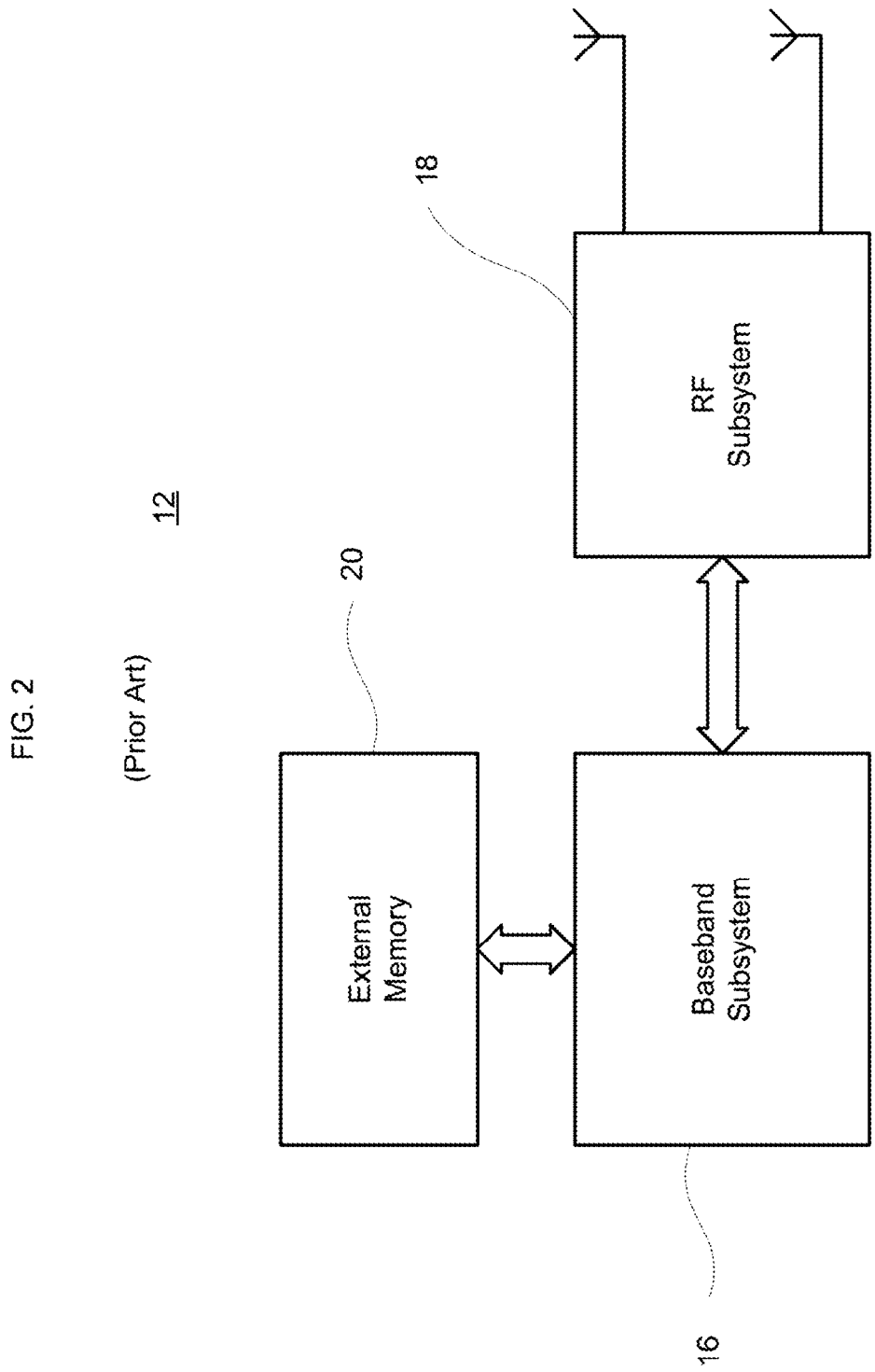
FIG. 2 illustrates a general wireless mobile station diagram.

The foregoing aspects, features and advantages of the present invention will be further appreciated when considered with reference to the following description of exemplary embodiments and accompanying drawings, wherein like reference numerals represent like elements. In describing the exemplary embodiments of the invention illustrated in the appended drawings, specific terminology will be used for the sake of clarity. However, the invention is not intended to be limited to the specific terms used.

Figure 6:
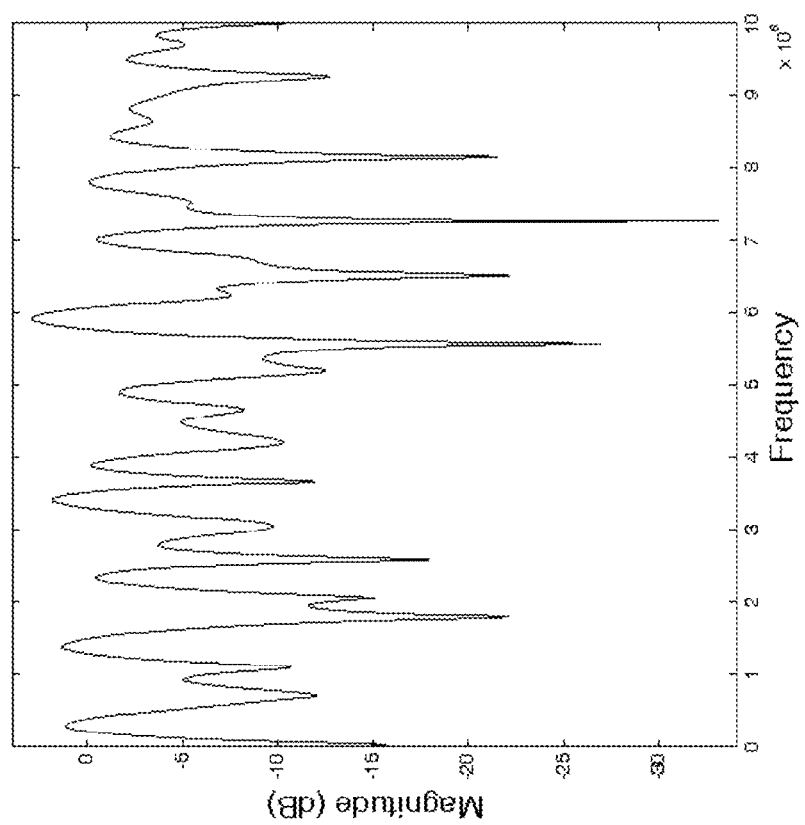
FIG. 6 illustrates an example of the ITU Pedestrian B propagation channel at a given instant for a 10 MHz RF channel bandwidth.

FIG. 6 shows an example magnitude response of an ITU Pedestrian B propagation channel at a given instant for a 10 MHz RF channel bandwidth. As seen in FIG. 6, regardless of the average SINR over the entire bandwidth of the RF channel, the local signal level and therefore the local SINR varies widely for different parts within the bandwidth of the RF channel.

According to an aspect of the present invention, the new channel estimation method adapts to the local SINR across different parts of the channel bandwidth. This leads to channel estimates that are optimized to SINR conditions prevailing in different parts of the channel bandwidth. The conventional channel estimation methods normally optimize the channel estimates for a single average SINR over the entire channel bandwidth. The channel estimation, which adapts to the varying SINR conditions within the channel bandwidth described, herein may result in the reduction of the channel estimation error. Furthermore, it may lead to improved channel estimation. The SINR of the received signal is usually not known and therefore the SINR itself may be estimated using techniques known in the literature.

Figure 7:
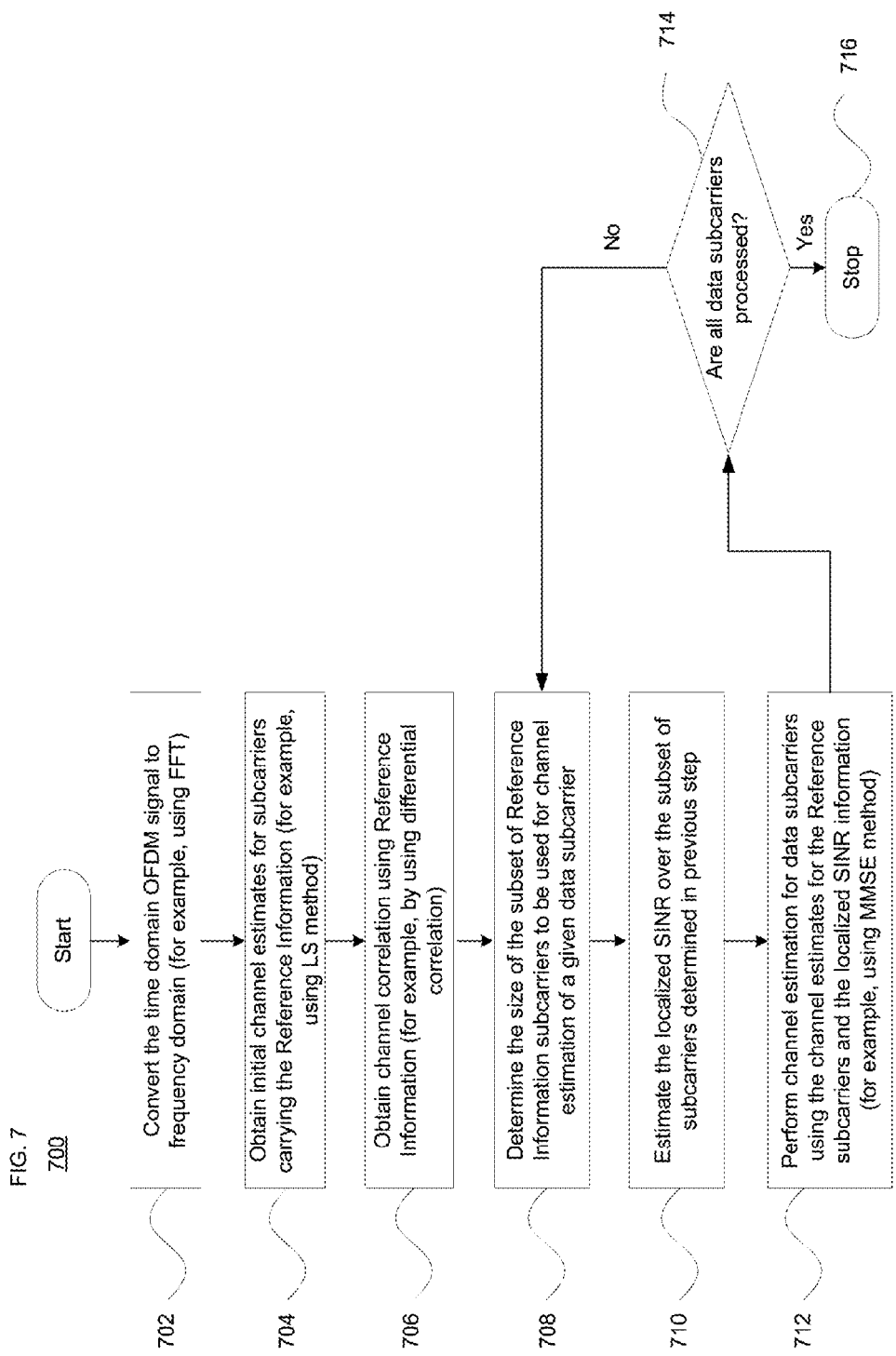
FIG. 7 illustrates a flow diagram for the processing steps according to aspects of the present invention.

The flow diagram 700 contained in FIG. 7 illustrates the channel estimation method according to the aspects of the present invention. The processing relevant to the present invention begins in processing block 702, where the received time domain signal is converted into the frequency domain. The conversion may be performed using a Fast Fourier Transform (FFT). In processing block 704, the initial channel estimates for the subcarriers carrying the reference information is obtained, for example using the Least Squares (LS) method as described below. Let the a priori known modulation information on the kth reference information subcarrier be sk and the received signal at the kth reference information subcarrier be rk. The LS estimate $\hat{h}_k$ at the reference information subcarrier n is thus given by:

$$\hat{h}_k = \frac{r_k}{s_k}.$$

At processing block 704, the channel correlation is obtained using the LS channel estimates $\hat{h}_k$ for the reference information subcarriers. An example method may be differential correlation $R_k$, where the adjacent LS channel estimates for the reference information subcarriers are correlated as follows:

$$R_k = \hat{h}_k \hat{h}_{k+1}^*.$$

The differential correlation over all available reference information subcarrier pairs may be computed and averaged to get a reliable estimate of the channel correlation. At processing block 708 the size of the subset of Reference Information subcarriers to be used for channel estimation of a given data subcarrier is determined based on the channel correlation estimated in processing block 706. At processing block 710, the localized SINR over the subset of subcarriers determined in the previous step is estimated. In processing block 712, the channel estimation for data subcarriers using the channel estimates for the reference information subcarriers and the localized SINR information is performed using known techniques in literature such as MMSE. At processing block 714 a decision is made whether all the data subcarriers are processed or not. If all the data subcarriers are not processed the processing returns to block 708, otherwise the channel estimation processing stops at block 716.

Figure 8:
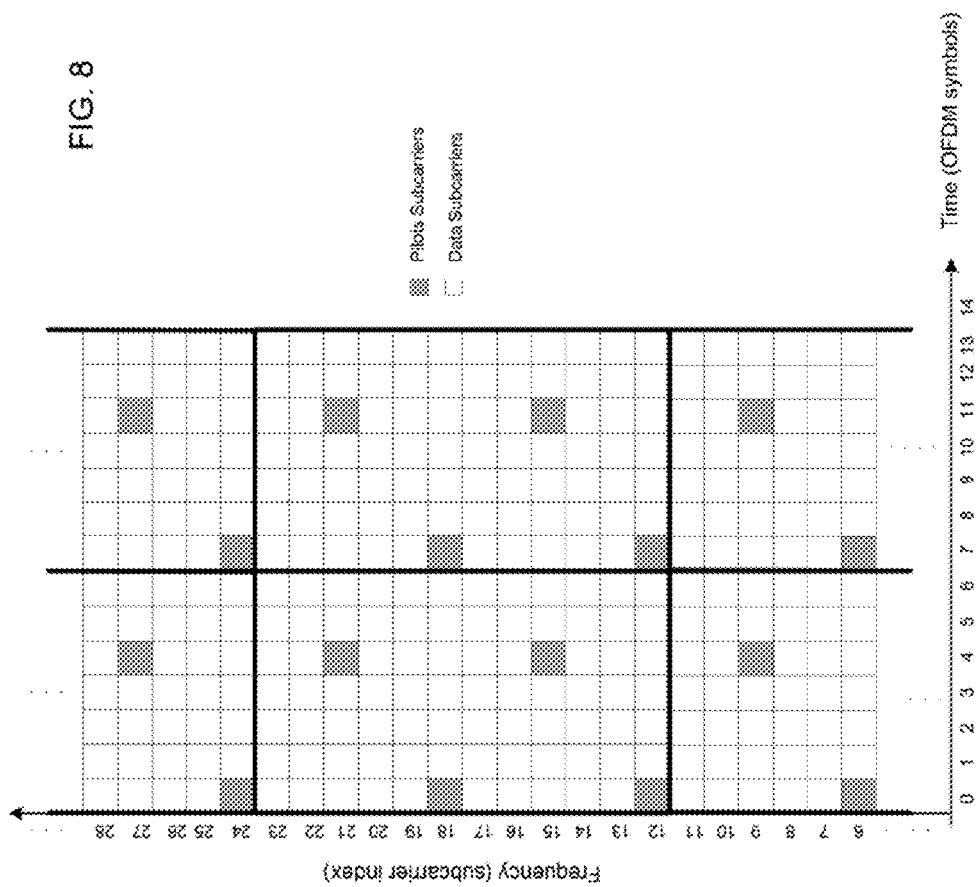
FIG. 8 illustrates an example of pilot and data subcarrier arrangement in a 3GPP LTE wireless communication system.

Aspects of the present invention are explained through application to a broadband wireless communication system based on an Orthogonal Frequency Division Multiplexing (OFDM), such as a 3rd Generation Partnership Project (3GPP) Long Term Evolution (LTE) wireless communication system. In an LTE wireless communication system, the information is transmitted over a large number of subcarriers in a given RF channel bandwidth. For example, a 10 MHz channel may be used with 600 subcarriers each separated by a 15 KHz separation. This covers 9 MHz of the channel bandwidth and leaves about 0.5 MHz on each side of the channel for guard bands. To facilitate channel estimation, some of the subcarriers may be used as pilot subcarriers. The terms pilot, pilot subcarrier, and pilot symbol are used interchangeably herein, and are all examples of reference information. In some systems the reference information may be present in every OFDM symbol while in some other systems the reference information may be present in some OFDM symbols at periodic intervals. An example arrangement of reference information for the 3GPP LTE wireless communication system is shown in FIG. 8.

Figure 9:
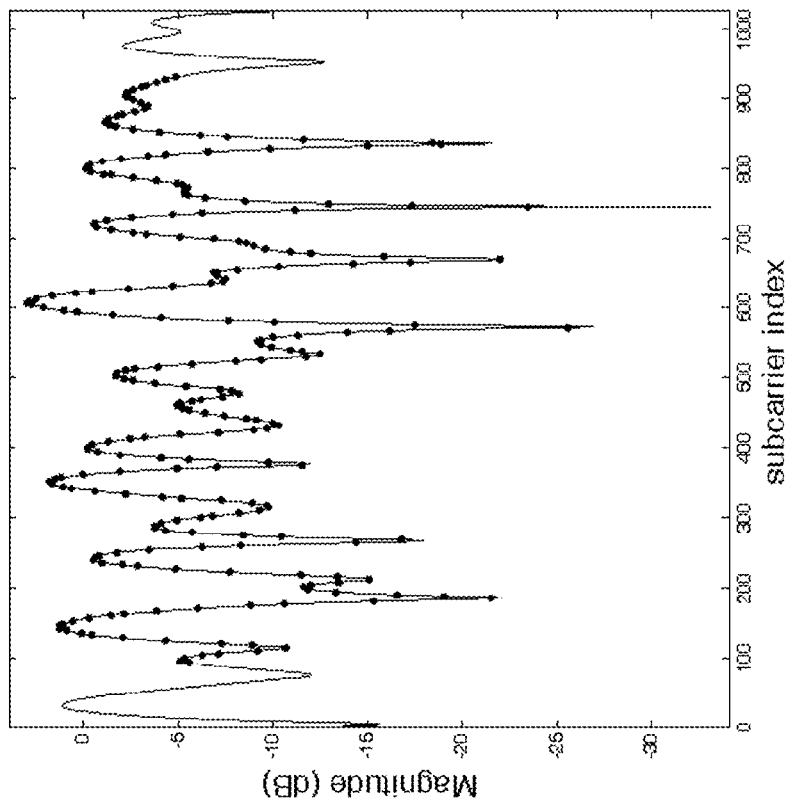
FIG. 9 illustrates an example of an ITU Pedestrian B propagation channel for a 10 MHz RF channel bandwidth with 600 subcarriers per OFDM symbol.

FIG. 9 illustrates an example of an ITU Pedestrian B propagation channel for one OFDM symbol in case of a 10 MHz RF channel bandwidth for the 3GPP LTE wireless communication system with 600 subcarriers. In the figure, the solid circles represent the reference information subcarriers. Note that the subcarriers are not present at the edges of the channel bandwidth, as the edges are used to provide guard bands between adjacent RF channels.

The channel estimates for the pilot subcarriers are obtained by employing one of the commonly used channel estimation methods such as LS. Specifically, the modulation symbols for the pilots are known a priori as defined in the 3GPP LTE wireless communication system specifications. Using this information, the LS estimates at the pilot positions are obtained. Next the channel estimation for a particular data subcarrier may be performed using only a subset of pilot channel estimates that have a non-negligible correlation with the data subcarrier for which the channel estimation is being performed.

According to an aspect of the present invention, the SINR used in the channel estimation is the estimated SINR only from the portion of the RF channel for which the channel estimation is being performed, as shown in FIG. 10A. For example, for the channel estimation of any data subcarrier in Portion 1, SINR 1 is used. The portion considered in this example consists of a predetermined number of subcarriers, such as the twelve subcarriers shown.

According to another aspect of the present invention, the portion may be dynamically adapted based on the channel correlation, as shown in FIG. 10B. In the example of FIG. 10B, the portion uses 24 subcarriers, and it may be changed to different sizes dynamically within the RF channel bandwidth based on the estimated channel correlation. The channel correlation for SINR estimation and localization purposes may be considered in both the frequency axis and the time axis. According to another aspect of the invention, the estimated channel correlation along the frequency axis alone may be considered for channel estimation within a single OFDM symbol that include the reference information. For other OFDM symbols both the correlation along time and frequency axis may be considered. The channel correlation along the frequency axis may be estimated based on delay spread of the channel. The channel correlation along the frequency axis may be estimated using the differential correlation of adjacent Reference Information symbols.

According to yet another aspect of the present invention, the SINR used for the channel estimation for a data subcarrier is the estimated SINR for a group of subcarriers that are closest to the data subcarrier. Specifically, a window of subcarriers is selected. And this selection of the window size is determined based on the channel correlation centered around the data subcarrier for which the channel estimation needs to be performed. For example, for data subcarrier 4, SINR 1 is used; for data subcarrier 6, SINR 2 is used; and for data subcarrier 7, SINR 3 is used and so on as shown in FIG. 10C. In all three cases above, the window size is the same but the exact subset of subcarriers used varies depending on the location of the subcarrier whose channel estimation is to be performed.

In some wireless communication systems, the SINR estimation itself may be based on the pilot channel estimates corresponding to the portion of the RF channel for which channel estimation is being performed. For example, the local SINR for the portion of the RF channel for which the channel estimation is being performed may be estimated by using the mean power level of the pilot channel estimates in the same portion of the RF channel. As shown in FIG. 10A, the SINR estimate for portion 1 may be based on the pilot subcarriers in portion 1. An example application of the present invention is to the MMSE channel estimation method and its variants. The MMSE channel estimation method generates channel estimates by proportionally combining the pilot channel estimates based on the channel correlation and the SINR statistics. The relative influence of the channel correlation and the local SINR may be adjusted for each subcarrier for which the MMSE method is being applied. According to aspects of the present invention, the estimated channel correlation and local SINR may be used to select from a set of predetermined filters for performing the MMSE or Wiener filtering.

While aspects of the invention have been illustrated for a broadband wireless communication system, they may be applied to other communication systems where the SINR varies considerably across the channel bandwidth. For wireless communication systems where the propagation channel may have large delay spreads, the SINR varies rapidly across the channel bandwidth.

The methods disclosed in the aforementioned examples of the present invention enable more accurate channel estimation when compared to conventional methods which uses average SINR obtained over the entire channel bandwidth. The improved channel estimation in turn may lead to improved data demodulation. The improved data demodulation may reduce the error rate at the receiver and this in turn may improve the data throughput and may reduce the number of retransmissions and may reduce the power consumption. Thus, the receiver of the communication device may operate more efficiently from both a processing standpoint and a power consumption standpoint.

In another alternative, aspects of the present invention may be implemented in network elements in addition to or distinct from implementation in mobile stations. For instance, one or more base stations of a wireless communication network, such as an OFDM based wireless network, may employ a baseband subsystem and/or an RF subsystem such as those detailed above. Software and/or firmware embodying any of the methods in accordance with aspects of the present invention may be executed by a controller or signal processor of the baseband subsystem or the RF subsystem. In another alternative, aspects of the present invention may also be implemented as a combination of firmware and hardware of the baseband subsystem, for instance with the hardware employing a processing device to execute the firmware.

Figure 3:
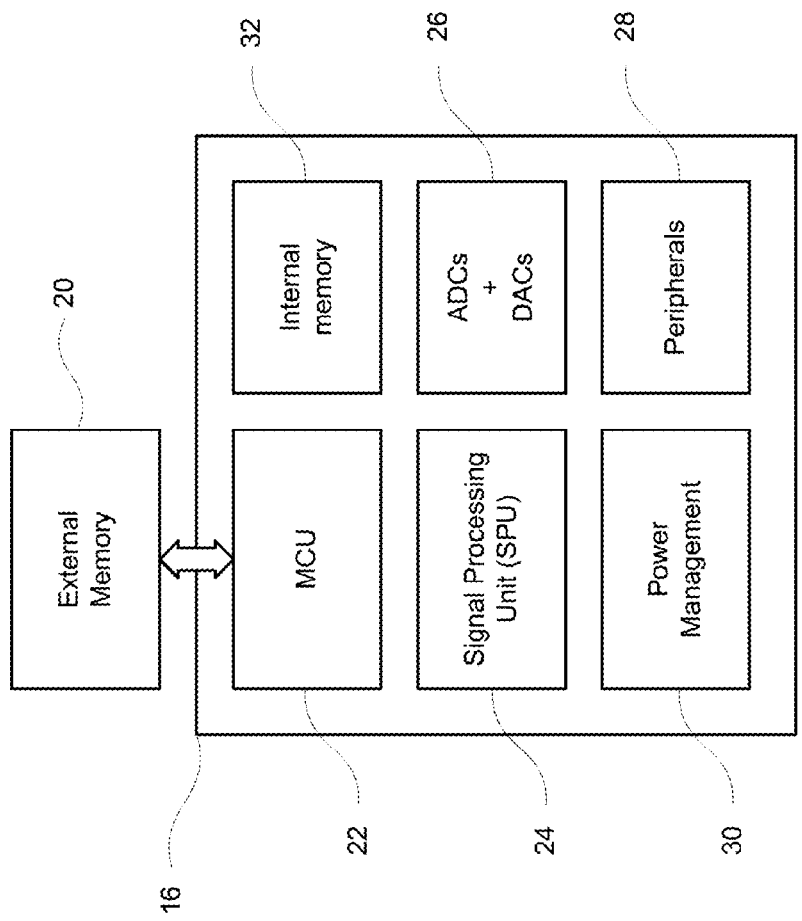
FIG. 3 illustrates a baseband subsystem for a wireless mobile station, which may be employed with aspects of the present invention.
Figure 4:
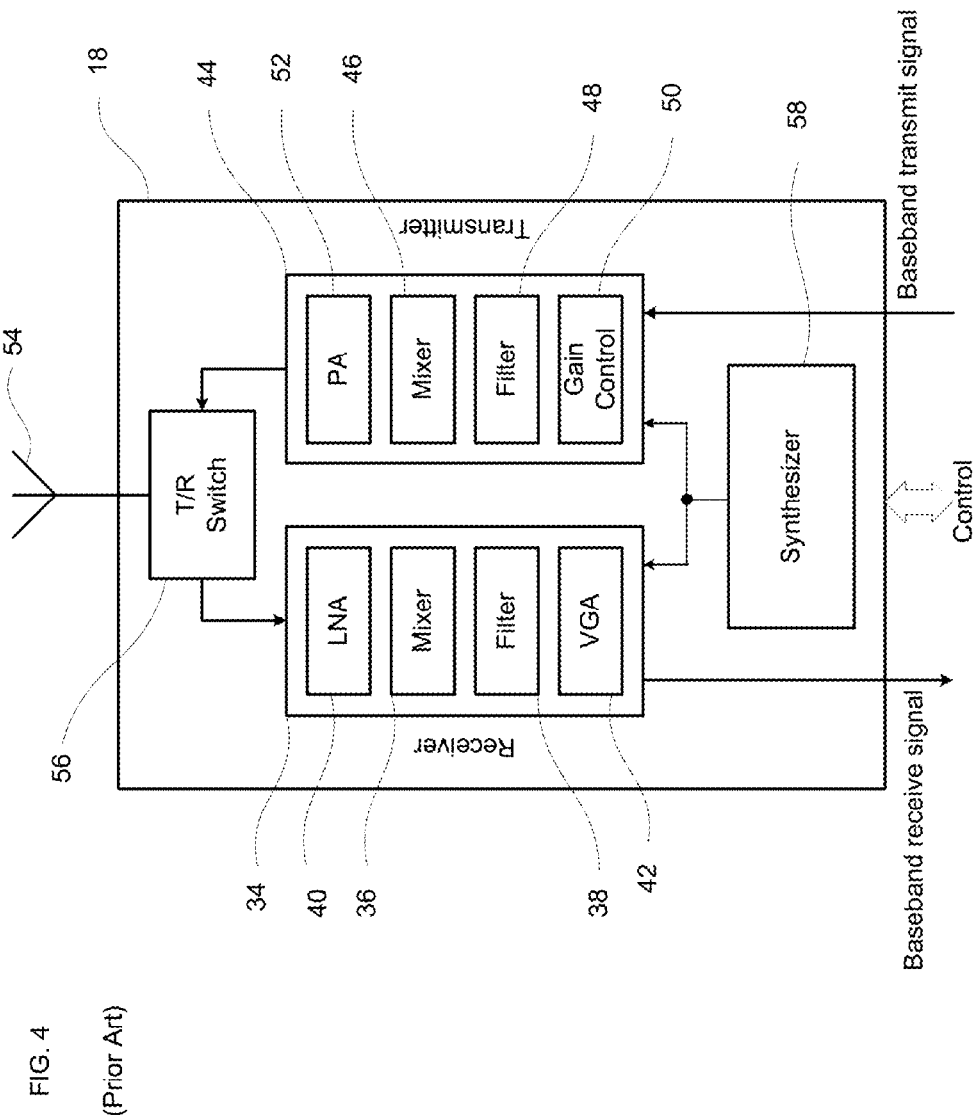
FIG. 4 illustrates an RF subsystem for a wireless mobile station, which may be employed with aspects of the present invention.
Figure 5:
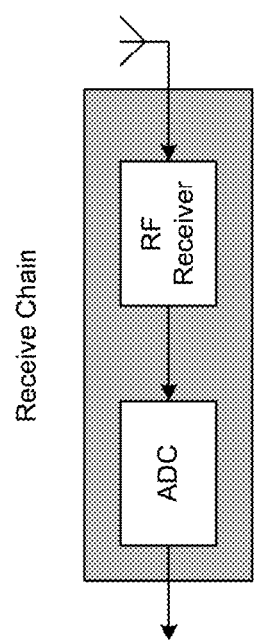
FIG. 5 illustrates a generalized receive chain of a wireless communication system.

Aspects of the present invention may be implemented in firmware of the MCU or the SPU of the baseband subsystem 16 in FIG. 3. In another alternative, aspects of the present invention may also be implemented as a combination of firmware and hardware of the baseband subsystem 16 in FIG. 3. In a further alternative, aspects of the present invention may also be implemented as a combination of firmware and hardware of the RF subsystem 18.

In accordance with such aspects of the present invention, the channel estimation using locally prevailing SINR conditions in the RF channel bandwidth may be applied to various wireless communication systems such as systems based on an IEEE 802.16 wireless communication standard, an IEEE 802.11 wireless communication standard, an IEEE 802.20 wireless communication standard, or a Long Term Evolution (LTE), a 3GPP wireless communication standard.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. Aspects of each embodiment may be employed in the other embodiments described herein.

The invention claimed is:

1. A method of channel estimation in a receiver used in a wireless communication system, the method comprising:
   identifying, by one or more processors of the receiver, reference information for a received signal;
   deriving, by the one or more processors, a channel correlation estimate from the reference information;
   determining, by the one or more processors from the derived channel correlation estimate, a size of a subset of reference information subcarriers to be used for channel estimation of a given data subcarrier, the subset being fewer than all of the reference information subcarriers associated with the received signal;
   estimating, by the one or more processors, a localized Signal-to-Interference and Noise Ratio (SINR) over the subset of the reference information subcarriers; and
   performing, by the one or more processors, channel estimation for the given data subcarrier using the channel correlation estimate and the estimated localized SINR, the channel estimation being applicable to data demodulation of the received signal.

2. The method of claim 1, wherein the reference information comprises at least one of pilot symbols and training symbols of the received signal.

3. The method of claim 1, wherein estimating the localized SINR is performed across different parts of a channel bandwidth of the received signal.

4. The method of claim 1, wherein the estimated localized SINR is limited to a portion of a radio frequency (RF) channel of the received signal for which channel estimation is being performed.

5. The method of claim 1, wherein a portion of a radio frequency (RF) channel of the received signal for which channel estimation is being performed is dynamically adjustable according to the channel correlation estimate.

6. The method of claim 1, wherein the estimated localized SINR is an estimated SINR for a group of subcarriers that are closest to the given data subcarrier.

7. The method of claim 6, further comprising selecting a window of subcarriers, wherein selection of a size of the window is determined using channel correlation centered around a particular data subcarrier for which the channel estimation is being performed.

8. The method of claim 1, wherein the estimated localized SINR for a portion of a radio frequency (RF) channel for which the channel estimation is being performed is estimated using a mean power level of any pilot channel estimates in a same portion of the RF channel.

9. The method of claim 1, wherein the channel correlation and the estimated localized SINR are used to select from a set of predetermined filters for performing Minimum Mean Square Error or Wiener filtering.

10. A receiver device for use in a wireless communication apparatus, the receiver device comprising:
    means for receiving a signal, the received signal having reference information associated therewith; and
    one or more processing devices operatively coupled to the receiving means, the one or more processing devices being configured to:
    derive a channel correlation estimate from the reference information;
    determine, from the derived channel correlation estimate, a size of a subset of reference information subcarriers to be used for channel estimation of a given data subcarrier, the subset being fewer than all of the reference information subcarriers associated with the received signal;
    estimate a localized Signal-to-Interference and Noise Ratio (SINR) over the subset of the reference information subcarriers; and
    perform channel estimation for the given data subcarrier using the channel correlation estimate and the estimated localized SINR, the channel estimation being applicable to data demodulation of the received signal.

11. The receiver device of claim 10, wherein the receiving means comprises one of a radio frequency (RF) subsystem of the wireless communication apparatus, a receiver of the RF subsystem, or a receive chain of the wireless communication apparatus.

12. The receiver device of claim 10, wherein the one or more processors estimate the localized SINR across different parts of a channel bandwidth of the received signal.

13. The receiver device of claim 10, wherein a portion of a radio frequency (RF) channel of the received signal for which channel estimation is performed is dynamically adjustable according to the channel correlation estimate.

14. The receiver device of claim 10, wherein the estimated localized SINR for a portion of a radio frequency (RF) channel for which the channel estimation being performed is estimated using a mean power level of any pilot channel estimates in a same portion of the RF channel.

15. A wireless communication apparatus comprising:
    a radio subsystem including a receiver element configure to receive a signal, the received signal having reference information associated therewith; and
    a baseband subsystem including one or more processing devices operatively coupled to the receiver element of the radio subsystem, the one or more processing devices being configured to:
    derive a channel correlation estimate from the reference information;

determine, from the derived channel correlation estimate, a size of a subset of reference information subcarriers to be used for channel estimation of a given data subcarrier, the subset being fewer than all of the reference information subcarriers associated with the received signal;

estimate a localized Signal-to-Interference and Noise Ratio (SINR) over the subset of the reference information subcarriers; and perform channel estimation for the given data subcarrier using the channel correlation estimate and the estimated localized SINR, the channel estimation being applicable to data demodulation of the received signal.

16. The wireless communication apparatus of claim 15, wherein the estimated localized SINR is limited to a portion of a radio frequency (RF) channel of the received signal for which channel estimation is performed.

17. The wireless communication apparatus of claim 15, wherein the estimated localized SINR is an estimated SINR for a group of subcarriers that are closest to the given data subcarrier.

18. The wireless communication apparatus of claim 17, the one or more processing devices being further configured to select a window of subcarriers, wherein selection of a size of the window is determined using channel correlation centered around a particular data subcarrier for which the channel estimation is being performed.

19. A non-transitory recording medium storing instructions thereon, the instructions, when executed by one or more processing devices, cause the one or more processing devices to execute a method of channel estimation, the method comprising:

identifying, by one or more processors, reference information for a received signal;

deriving, by the one or more processors, a channel correlation estimate from the reference information;

determining, by the one or more processors from the derived channel correlation estimate, a size of a subset of reference information subcarriers to be used for channel estimation of a given data subcarrier, the subset being fewer than all of the reference information subcarriers associated with the received signal;

estimating, by the one or more processors, a localized Signal-to-Interference and Noise Ratio (SINR) over the subset of the reference information subcarriers; and performing, by the one or more processors, channel estimation for the given data subcarrier using the channel correlation estimate and the estimated localized SINR, the channel estimation being applicable to data demodulation of the received signal.

20. The non-transitory recording medium of claim 19, wherein the reference information comprises at least one of pilot symbols and training symbols of the received signal.

21. The non-transitory recording medium of claim 19, wherein estimating the localized SINR is performed across different parts of a channel bandwidth of the received signal.

22. The non-transitory recording medium of claim 19, wherein the estimated localized SINR is an estimated SINR for a group of subcarriers that are closest to the given data subcarrier.

* * * * *